United States Patent [19]

Flake et al.

[11] Patent Number: 5,748,400
[45] Date of Patent: May 5, 1998

[54] METHOD OF COMPENSATING FOR THE MISREGISTRATION OF THE RADIAL TRACK POSITIONS OF A FLOPPY DISKETTE IN A DISK DRIVE

[75] Inventors: Lance Leslie Flake; Gregory Black Shonle, both of Boulder, Colo.

[73] Assignee: Optics Research, Inc., Boulder, Colo.

[21] Appl. No.: 660,007

[22] Filed: Jun. 3, 1996

[51] Int. Cl.$^6$ .................................................... G11B 5/596
[52] U.S. Cl. ................................. 360/77.02; 360/77.08; 360/77.03
[58] Field of Search .................... 369/58, 32; 360/77.02, 360/77.08, 77.03, 77.01, 77.07

[56] References Cited

U.S. PATENT DOCUMENTS 4,984,227  1/1991  Yoshimara ........................... 360/73.03

Primary Examiner—Nabil Hindi
Attorney, Agent, or Firm—Thomas E. Schatzel; Law Offices of Thomas E. Schatzel

[57] ABSTRACT

A method comprises receiving a diskette into a drive, determining the logical format type of the data written on the diskette, and targeting any recorded track on either surface of the diskette that has both inner and outer adjacent tracks. The head actuator in the drive is moved to the expected position for the targeted track that has been determined by a factory precalibration. The head actuator is then stepped inside by one sixteenth of the width of a standard track pitch and an attempt is made to read a sector header from the recorded track. If the reading of the sector header succeeded, the head actuator is stepped in again by one sixteenth and the sector header is read again. Such inward stepping is continued until the reading of the sector header fails. The radial position at which this occurs is defined as the inner boundary of the track. The outer boundary is found in similar fashion. The track center is computed as the midpoint between such inner and outer boundaries. The track centers for all the other tracks on the diskette are then assumed to be consistently registered from the targeted track's center.

9 Claims, 2 Drawing Sheets

METHOD OF COMPENSATING FOR THE MISREGISTRATION OF THE RADIAL TRACK POSITIONS OF A FLOPPY DISKETTE IN A DISK DRIVE

BACKGROUND OF THE INVENTION

1. Field of the Invention

The invention relates generally to computer data storage systems and more specifically to methods for compensating for the radial misregistrations of the magnetic data recording tracks on a floppy diskette when used in a disk drive that did not originally record such tracks.

2. Description of the Prior Art

The interchangeability of floppy disks with disk drives is critical to how people use personal computer systems. Software manufacturers universally rely on the ability of the population of users' disk drives to read and load what they have recorded with the disk drives at the factory.

Traditionally, the correct radial positioning of a floppy disk drive head has relied on stepper motors and other mechanisms that increment the actuator to where a target track should be. That works well when the tracks are widely spaced and the loss of signal amplitude caused by radial misregistration is insignificant. But ever increasing demands for data storage density, even from floppy disks, has caused disk system designers to pack more tracks to the radial inch. This makes it much more likely that problems will develop as a result of radial misregistration, especially when interchanging diskettes between drives that may be at opposite limits of their permissible radial offsets.

SUMMARY OF THE PRESENT INVENTION

It is therefore an object of the present invention to provide a method for accessing the data from floppy disks with misregistered data tracks.

It is another object of the present invention to provide a method of floppy disk data access that promotes the interchangeability of diskettes between drives.

Briefly, a method embodiment of the present invention comprises receiving a diskette into a drive, determining the logical format type of the data written on the diskette, and targeting any recorded track on either surface of the diskette that has both inner and outer adjacent tracks. The head actuator in the drive is moved to the expected position for the targeted track that has been determined by a factory precalibration. The head actuator is then stepped inside by one sixteenth of the width of a standard track pitch and an attempt is made to read a sector header from the recorded track. If the reading of the sector header succeeded, the head actuator is stepped in again by one sixteenth and the sector header is read again. Such inward stepping is continued until the reading of the sector header fails. The radial position at which this occurs is defined as the inner boundary of the track. The outer boundary is found in similar fashion. The track center is computed as the midpoint between such inner and outer boundaries. The track centers for all the other tracks on the diskette are then assumed to be consistently registered from the targeted track's center.

An advantage of the present invention is that a method is provided that improves the interoperability and interchangeability of diskettes between disk drives.

These and many other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
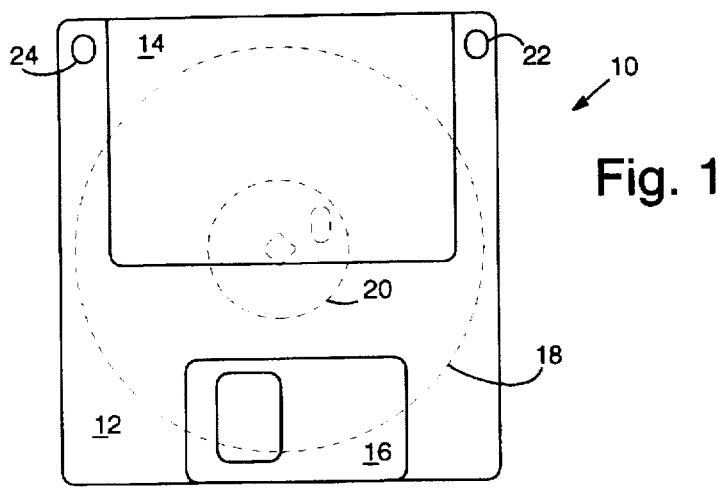
FIG. 1 is a side view of a diskette embodiment of the present invention.

FIG. 1 illustrates a high density magnetic diskette of the present invention, referred to herein by the general reference numeral 10. The diskette 10 comprises a hard plastic jacket 12, a label 14, a metal slide window 16, and a flexible magnetic media 18 mounted to a central hub 20. A mechanical flag 22 indicates whether a user wishes to prohibit magnetic recording of the diskette by a matching diskette drive, and a second mechanical flag 24 indicates to the drive some information about the storage capacity of the diskette 10.

Figure 2:
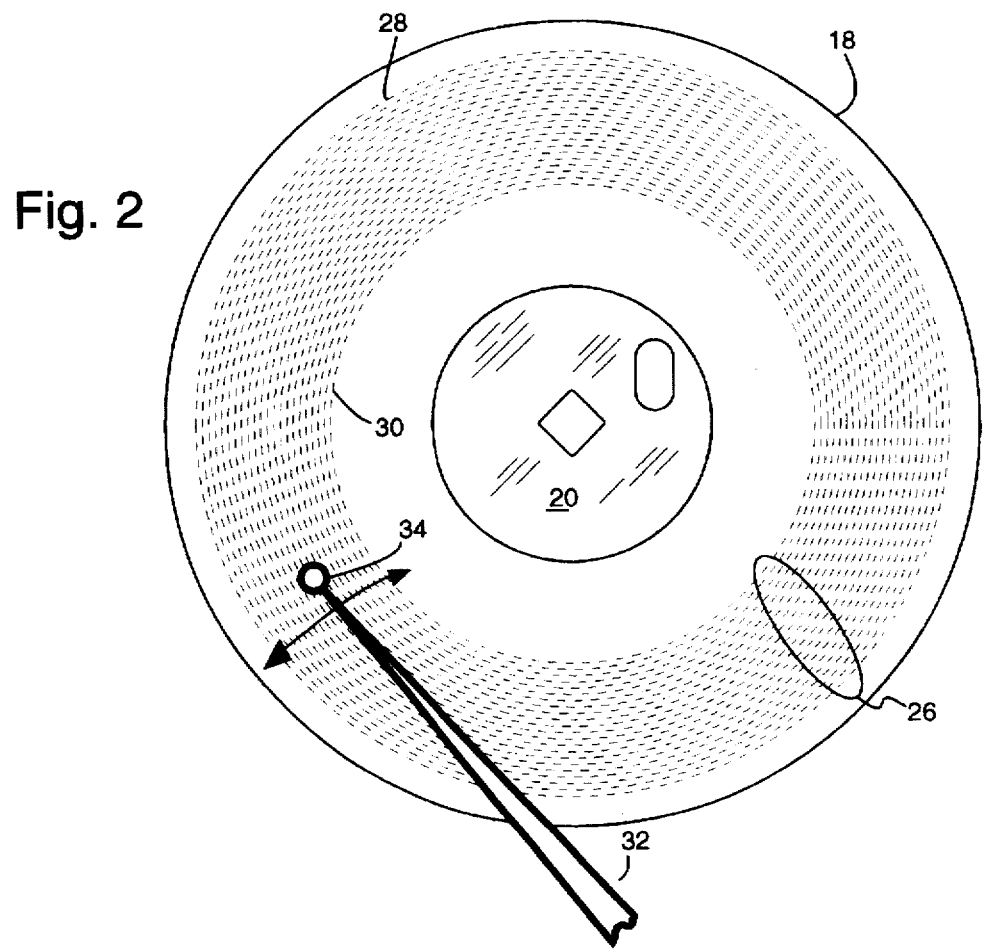
FIG. 2 is a plan view of the flexible magnetic media included in the diskette of FIG. 1.

FIG. 2 shows the flexible magnetic media 18 in greater detail. A plurality of concentric data tracks 26 with a constant track to track spacing are formatted on one or both sides of the media 18 and includes an outermost track (TRK-0) 28 and an innermost track (TRK-N) 30. The pitch and width of the magnetic recording tracks can be arbitrarily defined, e.g., 1500 tracks per inch. An actuator 32 carries a read/write (R/W) magnetic head 34 that can be servoed between inner and outer "crash stops", e.g., hard mechanical sweep limits to the actuator 32 that prevent excursions of the R/W head 34 beyond the surface of media 18.

Figure 3:
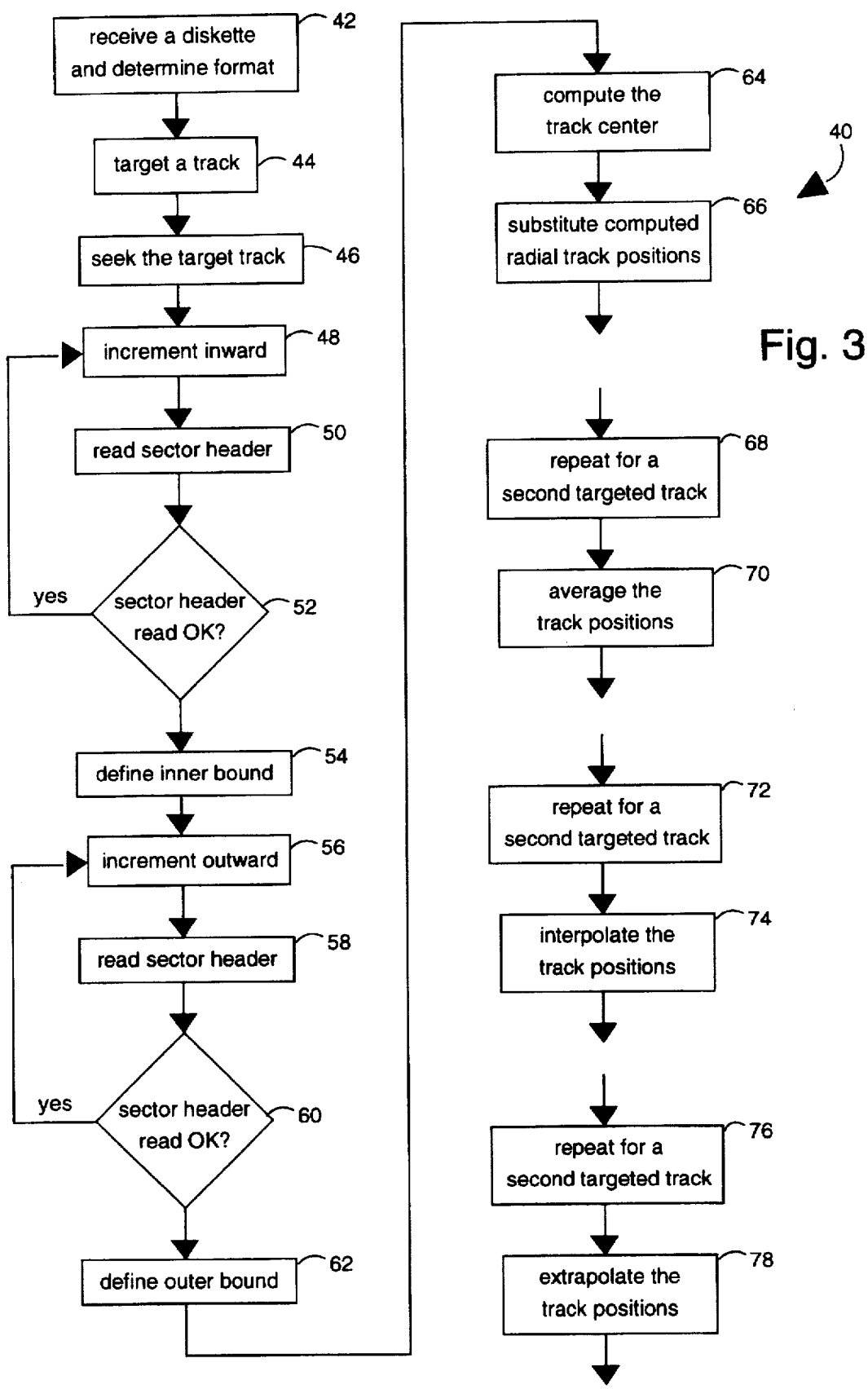
FIG. 3 is a flowchart of a method embodiment of the present invention and several alternative embodiments.

FIG. 3 is a flowchart of a method embodiment of the present invention, referred to herein by the general reference numeral 40. The method 40 provides for the accessing data on a diskette, e.g., diskette 10 (FIG. 1), by a disk drive with a head actuator, e.g., actuator 32 (FIG. 2). The method 40 comprises a step 42 for receiving a diskette into a disk drive and determining the logical format type of the data written on the diskette. A step 44 is used for targeting any recorded track on any surface of the diskette that has both inner and outer adjacent tracks, e.g., any track 26 except tracks 28 or 30 in FIG. 2. A step 46 moves a head actuator in the drive to an expected position for the first targeted track according to a factory precalibration. A step 48 increments the head actuator inward by a fraction of the width of a standard track pitch, e.g., a sixteenth of the track pitch. A step 50 attempts to read a sector header prerecorded on the first targeted track. A step 52 repeats the previous two steps of stepping inward and attempting to read if the reading of the sector header has succeeded. Otherwise, a step 54 determines the radial position at which such inward stepping results in the failure of the reading of the sector header and defining such radial position as the inner boundary of the first targeted track. A step 56 increments the head actuator outward by a fraction of the width of the standard track pitch. A step 58 attempts to read the sector header prerecorded on the first targeted track. A step 60 repeats the previous two steps 56 and 58 as long as the reading of the sector header succeeds. A step 62 determines the radial position at which such outward stepping results in the failure of the reading of the sector header and defining such radial position as the outer boundary of the first targeted track. A step 64 computes a track center between such inner and outer boundaries. A step 66 substitutes the radial position of such computed track center of the first targeted track for the factory-precalibration expected position in any subsequent track seeks by the head actuator.

In alternative embodiments, the step 66 includes substituting all the factory-precalibration expected positions of every track recorded on the diskette in any subsequent track seeks of the head actuator with a position registered from the radial position of such computed track center of the first targeted track.

The first step 42 in the method 40 is preferably included, but its inclusion is not critical.

In a first further alternative embodiment of the present invention, the steps 42 through 66 are repeated for a second targeted track, e.g., one that is several tracks away from the first targeted track. This is represented in FIG. 3 by a step 68. In a step 70, all the factory-precalibration expected positions of every track recorded on the diskette are substituted in any subsequent track seeks of the head actuator with a position registered from an average of the radial positions of such computed track centers of the first and second targeted tracks.

In a second further alternative embodiment of the present invention, the steps 42 through 66 are repeated for a second targeted track, e.g., one that is several tracks away from the first targeted track. This is represented in FIG. 3 by a step 72. In a step 74, some or all of the factory-precalibration expected positions of the track recorded on the diskette are substituted in any subsequent track seeks of the head actuator with a position registered from an interpolation of the radial positions of such computed track centers of the first and second targeted tracks.

In a third further alternative embodiment of the present invention, the steps 42 through 66 are repeated for a second targeted track, e.g., one that is several tracks away from the first targeted track. This is represented in FIG. 3 by a step 76. In a step 78, some or all of the factory-precalibration expected positions of every track recorded on the diskette are substituted in any subsequent track seeks of the head actuator with a position registered from an extrapolation of the radial positions of such computed track centers of the first and second targeted tracks.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for accessing data on a diskette by a disk drive with a head actuator, the method comprising the steps of:

receiving a diskette into a disk drive and determining the logical format type of the data written on the diskette;

targeting any recorded track on any surface of the diskette that has both inner and outer adjacent tracks;

moving a head actuator in said drive to an expected position for the first targeted track according to a factory precalibration;

stepping said head actuator inward by a fraction of the width of a standard track pitch;

attempting to read a sector header prerecorded on said first targeted track;

repeating the previous two steps of stepping inward and attempting to read if the reading of the sector header has succeeded;

determining the radial position at which such inward stepping results in the failure of the reading of the sector header and defining such radial position as the inner boundary of said first targeted track;

stepping said head actuator outward by a fraction of the width of said standard track pitch;

attempting to read said sector header prerecorded on said first targeted track;

repeating the previous two steps of stepping outward and attempting to read as long as the reading of the sector header succeeds;

determining the radial position at which such outward stepping results in the failure of the reading of the sector header and defining such radial position as the outer boundary of said first targeted track; and computing a track center as a point between such inner and outer boundaries.

2. The method of claim 1, further comprising the step of:
substituting the radial position of such computed track center of the first targeted track for said factory-precalibration expected position in any subsequent track seeks by said head actuator.

3. The method of claim 1, further comprising the step of:
substituting all the factory-precalibration expected positions of every track recorded on said diskette in any subsequent track seeks of said head actuator with a position registered from said radial position of such computed track center of the first targeted track.

4. A method for accessing data on a diskette by a disk drive with a head actuator, the method comprising the steps of:

targeting any recorded track on any surface of a diskette that has both inner and outer adjacent tracks;

moving a head actuator in said drive to an expected position for the first targeted track according to a factory precalibration;

stepping said head actuator inward by a fraction of the width of a standard track pitch;

attempting to read a sector header prerecorded on said first targeted track;

repeating the previous two steps of stepping inward and attempting to read if the reading of the sector header has succeeded;

determining the radial position at which such inward stepping results in the failure of the reading of the sector header and defining such radial position as the inner boundary of said first targeted track;

stepping said head actuator outward by a fraction of the width of said standard track pitch;

attempting to read said sector header prerecorded on said first targeted track;

repeating the previous two steps of stepping outward and attempting to read as long as the reading of the sector header succeeds;

determining the radial position at which such outward stepping results in the failure of the reading of the sector header and defining such radial position as the outer boundary of said first targeted track; and computing a track center as a point between such inner and outer boundaries.

5. The method of claim 4, further comprising the step of:
substituting the radial position of such computed track center of the first targeted track for said factory-precalibration expected position in any subsequent track seeks by said head actuator.

6. The method of claim 4, further comprising the step of:

substituting all the factory-precalibration expected positions of every track recorded on said diskette in any subsequent track seeks of said head actuator with a position registered from said radial position of such computed track center of the first targeted track.

7. The method of claim 4, further comprising the steps of:

targeting at least one more prerecorded track and computing a second targeted track center; and substituting all the factory-precalibration expected positions of every track recorded on said diskette in any subsequent track seeks of said head actuator with a position registered from an average of said radial positions of such computed track centers of the first and second targeted tracks.

8. The method of claim 4, further comprising the steps of:

targeting at least one more prerecorded track and computing a second targeted track center; and substituting all the factory-precalibration expected positions of every track recorded on said diskette in any subsequent track seeks of said head actuator with a position registered from interpolations of said radial positions of such computed track centers of the first and second targeted tracks.

9. The method of claim 4, further comprising the steps of:

targeting at least one more prerecorded track and computing a second targeted track center; and substituting all the factory-precalibration expected positions of every track recorded on said diskette in any subsequent track seeks of said head actuator with a position registered from extrapolations of said radial positions of such computed track centers of the first and second targeted tracks.

\* \* \* \* \*